(12) United States Patent
Masson et al.

(10) Patent No.: US 12,299,035 B1
(45) Date of Patent: May 13, 2025

(54) CONSISTENT HASHING WITH SEQUENTIAL INDEXING

(71) Applicant: DataDog Inc., New York City, NY (US)

(72) Inventors: Charles-Philippe Masson, Paris (FR); Homin K. Lee, Brooklyn, NY (US)

(73) Assignee: Datadog Inc., New York, NY (US)

( * ) Notice: Subject to any disclaimer, the term of this patent is extended or adjusted under 35 U.S.C. 154(b) by 0 days.

(21) Appl. No.: 18/394,275

(22) Filed: Dec. 22, 2023

(51) Int. Cl.
*G06F 16/901* (2019.01)

(52) U.S. Cl.
CPC .............................. *G06F 16/9014* (2019.01)

(58) Field of Classification Search
None
See application file for complete search history.

(56) References Cited

U.S. PATENT DOCUMENTS

2021/0326183 A1\* 10/2021 Leu ...................... G06F 9/5066
2023/0209352 A1\* 6/2023 Jackson ................ G01S 19/215
455/410

OTHER PUBLICATIONS

Appleton, B., et al., Multi-probe consistent hashing, CoRR, 2015.
Collet, Y., Presenting XXH3, https://fastcompression.blogspot.com/2019/03/presenting-xxh3.html, 2019.
Decandia, G., et al., Dynamo: Amazon's highly available key-value store, ACM SOSP, 21 (2007), pp. 205-220.
Dong, C., et al., DxHash: A Scalable Consistent Hash Based on the Pseudo-Random Sequence, CoRR, 2021.
Eisenbud, D., et al., Maglev: A Fast and Reliable Software Network Load Balancer, NSDI, 13 (2016), pp. 523-535.
Evensen, P., Stronger, better, morer, Moremur; a better Murmur3-type mixer, https:/mostlymangling.blogspot.com/2019/12/stronger-better-morer-moremur-better.html, 2019, 4 pgs.
Karger, D., et al., "Consistent Hashing and Random Trees: Distributed Caching Protocols for Relieving Hot Spots on the World Wide Web", STOC, pp. 654-663, 1997.
Lakshman, A., et al., Cassandra: a decentralized structured storage system, ACM SIGOPS, 44 (2010), pp. 35-40.
Lamping, J., et al., A Fast, Minimal Memory, Consistent Hash Algorithm, CoRR, 2014.

(Continued)

*Primary Examiner* — Nathan Sadler
(74) *Attorney, Agent, or Firm* — Botos Churchill IP Law LLP

(57) ABSTRACT

The technology provides a consistent hashing approach that can be used with many types of hash functions. This approach, called flip hashing, enables dynamic adjustment of a hash table while satisfying balance and monotonicity requirements. Flip hashing is particularly applicable to database and load rebalancing applications due to its low computational cost and ease of implementation. As computing resources are added to a system, keys are remapped evenly across the newly added resources, e.g., by one or more load-balancing or routing servers. This enables upscaling of the system to minimize hotspot issues. The computational cost for a flip hash approach is effectively constant and regardless of the number of resources. This can provide fast response times to queries and avoid overloading of routing servers.

20 Claims, 12 Drawing Sheets

(56) References Cited

OTHER PUBLICATIONS

Maiga, J., The construct of a bit mixer, https://jonkagstrom.com/bit-mixer-construction, 2020.
Mendelson, G., et al., "AnchorHash: A Scalable Consistent Hash", IEEE Trans., Networking, 29-2 (2021), pp. 516-528.
Mirrokni, V., et al., Consistent Hashing with Bounded Loads, SODA, pp. 587-604, 2018.
Nakatani, Y., Structured Allocation-Based Consistent Hashing With Improved Balancing for Cloud Infrastructure, IEEE Trans., Parallel and Distributed Systems, 32-9 (2021), pp. 2248-2261.
Olteanu, V., et al., Stateless Datacenter Load-balancing with Beamer, NSDI, 15 (2018), pp. 125-139.
Sackman, M., Perfect Consistent Hashing, CoRR, arXiv:1503.04988v2 [cs.DS] Mar. 18, 2015, 17 pgs.

\* cited by examiner

FIG. 2

Algorithm 1: $\tilde{f}$ (Flip Hash, $n$ being a power of 2)

Input: key $x \in X$, $r \in \{0, \ldots, q\}$
Output: $\tilde{f}(x, 2^r) \in [2^r]$ $a \leftarrow h_x(\sigma(0,0)) \bmod 2^r$  // lowest $r$ bits
$b \leftarrow \lfloor \log_2 a \rfloor$ if $a > 0$ else $0$
$c \leftarrow h_x(\sigma(b,0)) \bmod 2^b$  // lowest $b$ bits
return $a \oplus c$

| $r$ | $a$ | $b$ | $h_x(\sigma(b,0))$ | $c$ | $f(x,2^r)$ |
|---|---|---|---|---|---|
| 0 | $0000_2$ | 0 | $1011_2$ | $0000_2$ | $0000_2 = 0$ |
| 1 | $0001_2$ | 0 | $1011_2$ | $0000_2$ | $0001_2 = 1$ |
| 2,3 | $0011_2$ | 1 | $0101_2$ | $0001_2$ | $0010_2 = 2$ |
| 4 | $1011_2$ | 3 | $1101_2$ | $0101_2$ | $1110_2 = 14$ |

Table 1: Values taken by the variables of Algorithm 1 for $q = 4$, assuming that $h_x(\sigma(0,0)) = 11 = 1011_2$, $h_x(\sigma(1,0)) = 5 = 0101_2$, and $h_x(\sigma(3,0)) = 13 = 1101_2$.

Algorithm 2: $\tilde{f}$ (Flip Hash)

Input: key $x \in X$, number of resources $n \in \{1, \ldots, 2^q\}$
Output: $\tilde{f}(x, n) \in [n]$ $r \leftarrow \lceil \log_2 n \rceil$
$d \leftarrow \tilde{f}(x, 2^r)$
if $d < n$ then return $d$      // (A)
else
    for $i = 1 \ldots m$ do
        $c_i \leftarrow h_x(\sigma(r-1, i)) \bmod 2^r$    // lowest $r$ bits
        if $c_i < 2^{r-1}$ then return $\tilde{f}(x, 2^{r-1})$    // (B)
        else if $c_i < n$ then return $c_i$    // (C)
    return $\tilde{f}(x, 2^{r-1})$    // (D)

FIG. 5

| $n$ | $r$ | $d$ | $e_1$ | $e_2$ | $e_3$ | $e_4$ | $f(x,n)$ |
|---|---|---|---|---|---|---|---|
| 1 | 0 | 0 | | | | | $d=0$ |
| 2 | 1 | 1 | | | | | $d=1$ |
| 3, 4 | 2 | 2 | | | | | $d=2$ |
| 5, 6, 7, 8 | 3 | 2 | | | | | $d=2$ |
| 9, 10, 11 | 4 | 14 | 12 | 11 | 15 | 6 | $\tilde{f}(x, 2^3) = 2$ |
| 12 | 4 | 14 | 12 | 11 | | | $e_2 = 11$ |
| 13, 14 | 4 | 14 | 12 | | | | $e_1 = 12$ |
| 15, 16 | 4 | 14 | | | | | $d=14$ |

Table 2: Values taken by the variables of Algorithm 2 for $q = 4$, assuming that $h_x(\sigma(0,0)) = 11$, $h_x(\sigma(1,0)) = 5$, $h_x(\sigma(3,0)) = 13$, $h_x(\sigma(3,1)) = 12$, $h_x(\sigma(3,2)) = 11$, $h_x(\sigma(3,3)) = 15$, and $h_x(\sigma(3,4)) = 6$.

1002 — Performing, by one or more processors of a computer system, a first hash function on a key according to a first seed, to generate a first hash value having a fixed number of digits including a set of least significant bits and a set of most significant bits 1004 — Performing, by the one or more processors, a second hash function on the key according to a second seed, to generate a second hash value having the fixed number of digits, the second seed corresponding to a parameter of a given one of the most significant bits from the first hash value 1006 — Flipping, by the one or more processors, one or more of the set of least significant bits of the first hash value according to one or more least significant bits from the second hash value to generate a flipped hash 1008 — Identifying, by the one or more processors using the flipped hash, which one of a set of computing resources to assign a data element associated with the key 1010 — Assigning, by the one or more processors, the data element to the identified computing resource

CONSISTENT HASHING WITH SEQUENTIAL INDEXING

BACKGROUND

In large database applications, the stored data is distributed (horizontally partitioned) across many devices, such as servers in a server farm or cloud computing architecture. The number of resources may change, for instance due to a server being taken offline for service, or new servers being added to the system. There are various approaches to manage the distributed data, which can include using hash tables or other associative arrays to store data. With hash tables, a hash function is used to index the data. How a hash table is maintained as resources change can have a significant impact on system operation and performance.

BRIEF SUMMARY

The technology relates to a consistent hashing approach that can be used with many types of hash functions, which enables dynamic adjustment of the hash table while satisfying certain key criteria. These criteria include balance and monotonicity. Balance involves evenly dividing the key space of the hash table across the servers. Monotonicity limits key remapping to different servers when the resource set changes. This includes not unnecessarily shuffling data across previously existing servers (which can avoid overloading them). In addition, the system provides consistent-range hashing. The hash values are a range of contiguous integers in consistent-range hashing. Consistent-range hashing may be applied when arbitrary removal of resources is prevented, because they can then be indexed via the contiguous integers.

This technology is designed to achieve highly balanced consistent hashing, which evenly balances the key space across the available servers of the system according to a defined load ratio on the order of 1. For instance, the flip hash approach described herein ensures that each server effectively gets the same number of keys (ignoring rounding artifacts). Thus, if there are K keys and S servers, each server would get floor (K/S) or ceiling (K/S) keys. In contrast, other consistent hashing solutions, e.g., hash ring-based solutions, can have looser balance guarantees where server will get approximately K/S keys, but not necessarily exactly that amount. In one such example, the most loaded server in another approach may have 1.3*K/S keys mapped to it, while the least loaded would have 0.8*K/S keys mapped to it.

FIGS. 1A-C illustrate an example scenario. As shown in view 100 of FIG. 1A, there is a set of servers 102 that is configured to communicate with a set of clients 104 via a network 106. Here, each server 102 (e.g., a web server or a storage server) corresponds to a set of keys 108. While three servers 102 and six keys in the set 108 are shown, this is merely exemplary. There may be tens, hundreds, or thousands (or more) of the servers, and thousands, millions or billions (or more) of keys, depending on the type of system and/or information being provided.

FIG. 1B illustrates a view 120, where the number of servers 102 has been doubled. Here, in accordance with the flip hash approach, each added server has the equivalent amount of keys as the other servers. In contrast, as shown in view 140 of FIG. 1C, each added server 102' may be assigned a different amount of keys 108', 108". This may be done, for instance, by a router or other load balancer 110, as shown in FIG. 1A.

The flip hash approach, described in detail below, first hashes a key with a selected value according to the selected hash function. The key is then hashed again with another value associated with the index/position of the most significant 1-bit of the r least significant bits for the first hash (here, the position of the MSB that is equal to 1). A selected amount of least significant bits from the second hash is used to flip some of the least significant bits from the first hash. This depends on the position of the MSB 1-bit of the masked first hash.

By way of example, the key may be derived, e.g., by the router or other load balancer 110, from the content of the data item or it may be derived from metadata that is associated with the data item but is not included in the data item. For instance, an incoming data item (e.g., web request, log entry) may be associated with metadata tags and the metadata tags may be used as the key to identify which computing resource (e.g., a web server or a storage server) will handle the data item, but the data item stored is absent the metadata. The key could be a combination of information internal and external to the data item, such as a customer name, organization ID, app/service name, host ID, header/footer of data item, etc.

Unlike other approaches that may be suitable in some situations, the flip hash technology has constant-time complexity. Without constant-time complexity, another approach may experience performance deterioration logarithmically—in other words, as the number of resources (e.g., servers) increases, the computation cost to decide which server to send a request to increases logarithmically with the number of resources. In contrast, flip hashing's computational cost is generally constant and does not depend on the number of resources. This can have substantial technical benefits to large systems, such as load balancing across many servers, for instance by providing fast response times to queries and avoiding overloading of routing servers, which are the servers that can run the consistent hashing (flip hash) process to route requests to the servers that actually execute the requests, such as web servers.

According to one aspect of the technology, a computer-implemented method comprises: performing, by one or more processors of a computer system, a first hash function on a key according to a first seed, to generate a first hash value having a fixed number of digits including a set of least significant bits and a set of most significant bits; performing, by the one or more processors, a second hash function on the key according to a second seed, to generate a second hash value having the fixed number of digits, the second seed corresponding to a parameter of a given one of the most significant bits from the first hash value; flipping, by the one or more processors, one or more of the set of least significant bits of the first hash value according to one or more least significant bits from the second hash value to generate a flipped hash; identifying, by the one or more processors using the flipped hash, which one of a set of computing resources to assign a data element associated with the key; and assigning, by the one or more processors, the data element to the identified computing resource.

When a quantity of the computing resources is not a power of 2, the method may further comprise repetitively hashing the key with varying seed values one or more times until a hashing result, masked to a number of the least significant bits in the first hash value, is within the quantity of computing resources. The parameter may be a position of the given most significant bit from the first hash value. The first seed may be an injective function.

The set of computing resources may include a plurality of servers. In this case, the key may correspond to data to be cached by a specific one of the servers that is the identified computing resource. The plurality of servers may be a plurality of distributed web servers. Alternatively or additionally, the plurality of servers may include a first plurality of servers and a second plurality of servers. In this case, the first plurality of servers performs the first hash function, the second hash function, the flipping, and the identifying, and the second plurality of servers provides data items to one or more client computing devices based on the first hash function, the second hash function, the flipping, and the identifying performed by the first plurality of servers. Each server of the first plurality of servers may separately perform the first hash function, the second hash function, the flipping, and the identifying.

The one or more processors may correspond to one or more servers. In this case, each of the one or more servers is configured to separately perform the first hash function, the second hash function, the flipping, and the identifying. For any of the above, the method may provide constant-time, consistent range hashing evenly spreading a keyspace for a set of keys across the set of computing resources. 11. Moreover, for any of the above the method can provide a peak-to-average load ratio on the order of 1 while maintaining hashing monotonicity. For any of the above, the method may further comprise maintaining a number of least significant digits of the fixed number of digits according to a value of the first hash.

According to another aspect of the technology, a computing system comprises one or more processors configured to: perform a first hash function on a key according to a first seed, to generate a first hash value having a fixed number of digits including a set of least significant bits and a set of most significant bits; perform a second hash function on the key according to a second seed, to generate a second hash value having the fixed number of digits, the second seed corresponding to a parameter of a given one of the most significant bits from the first hash value; flip one or more of the set of least significant bits of the first hash value according to one or more least significant bits from the second hash value to generate a flipped hash; identify, using the flipped hash, which one of a set of computing resources to assign a data element associated with the key; and assign the data element to the identified computing resource.

When a quantity of the computing resources is not a power of 2, the one or more processors may be further configured to: repetitively hash the key with varying seed values one or more times until a hashing result, masked to a number of the least significant bits in the first hash value, is within the quantity of computing resources. Alternatively or additionally, the one or more processors can be configured to provide constant-time, consistent range hashing evenly spreading a keyspace for a set of keys across the set of computing resources. Alternatively or additionally, the one or more processors can be configured to provide a peak-to-average load ratio on the order of 1 while maintaining hashing monotonicity.

The computing system may further comprise the set of computing resources. In this case, the set of computing resources may include a plurality of servers, and the key corresponds to data to be cached by a specific one of the servers that is the identified computing resource. The plurality of servers may be a plurality of distributed web servers. Alternatively or additionally, the one or more processors may comprise a set of load-balancing or routing servers that are configured to separately maintain the flipped hash. Here, the computing resources may comprise one or more of a web server, a database server or a storage device.

BRIEF DESCRIPTION OF THE DRAWINGS

FIG. 2 illustrates an example algorithm for a flip hash approach in accordance with aspects of the technology.

FIG. 3 illustrates an example table of values for the algorithm of FIG. 2 in accordance with aspects of the technology.

FIG. 4 illustrates an example algorithm for a flip hash approach in accordance with aspects of the technology.

FIG. 5 illustrates an example table of values for the algorithm of FIG. 4 in accordance with aspects of the technology.

FIG. 10 illustrates an example method in accordance with aspects of the technology.

DETAILED DESCRIPTION

Figure 1A:
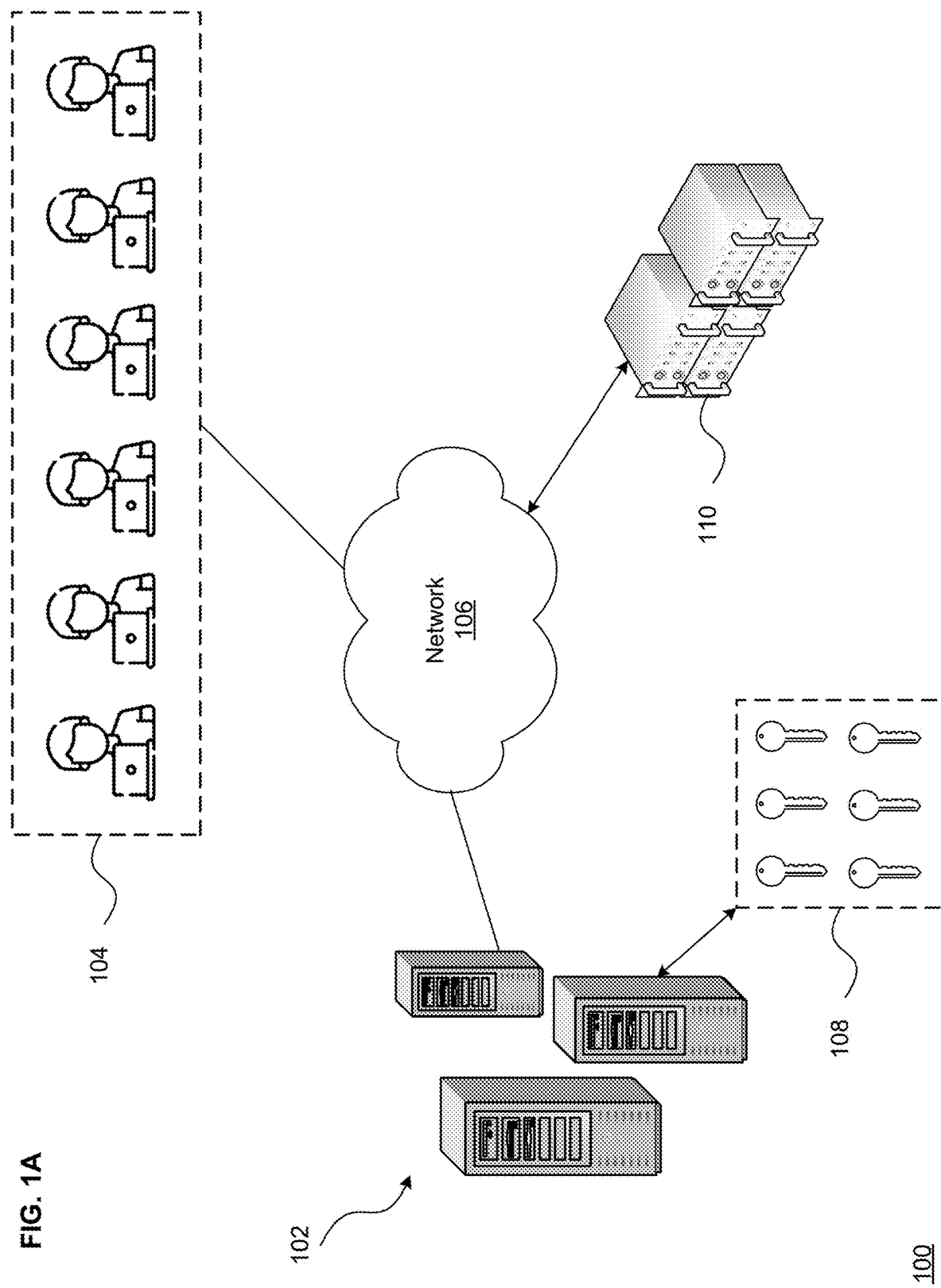
FIGS. 1A-C illustrate example scenarios in accordance with aspects of the technology.
Figure 1B:
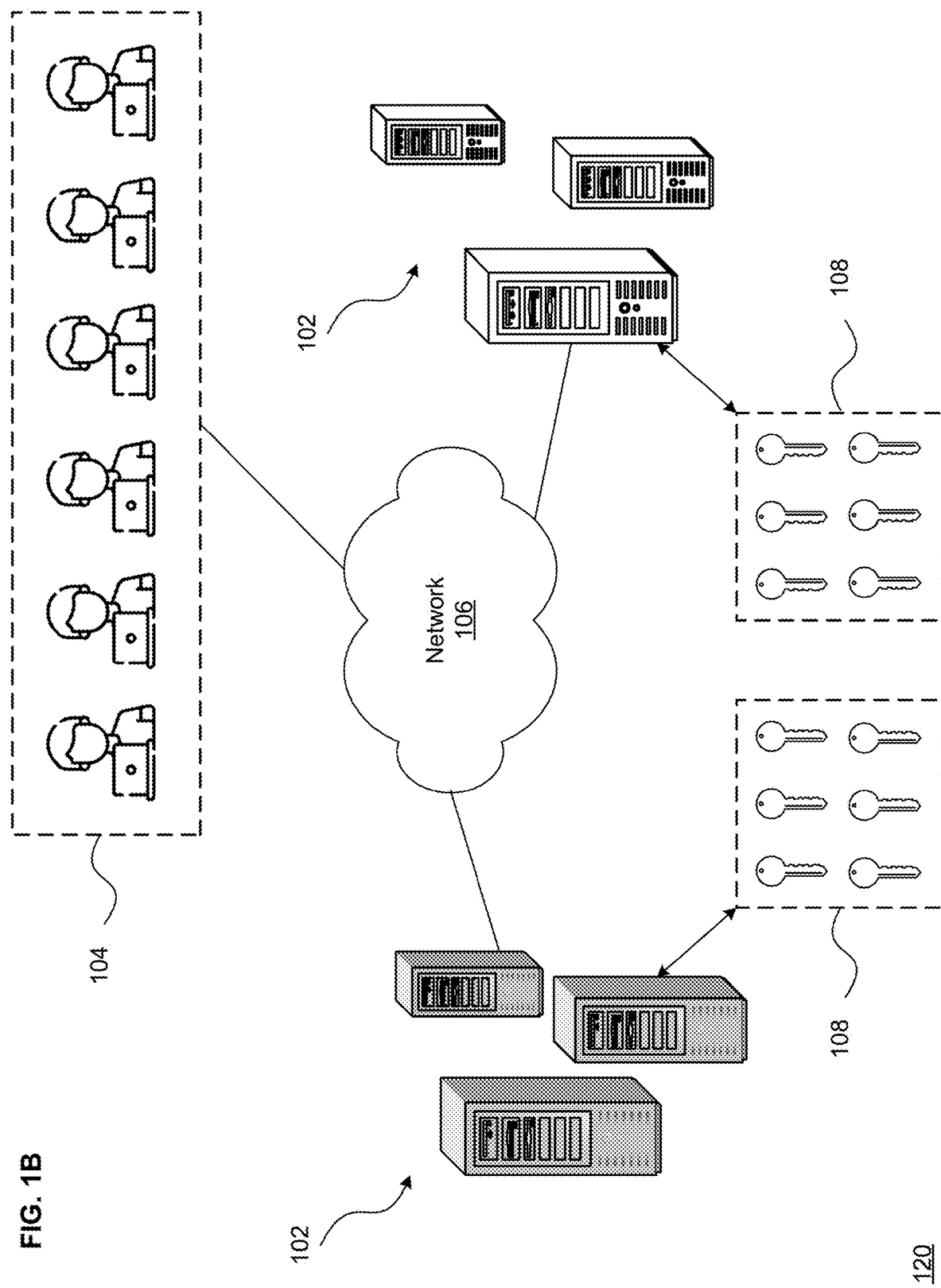
Figure 1C:
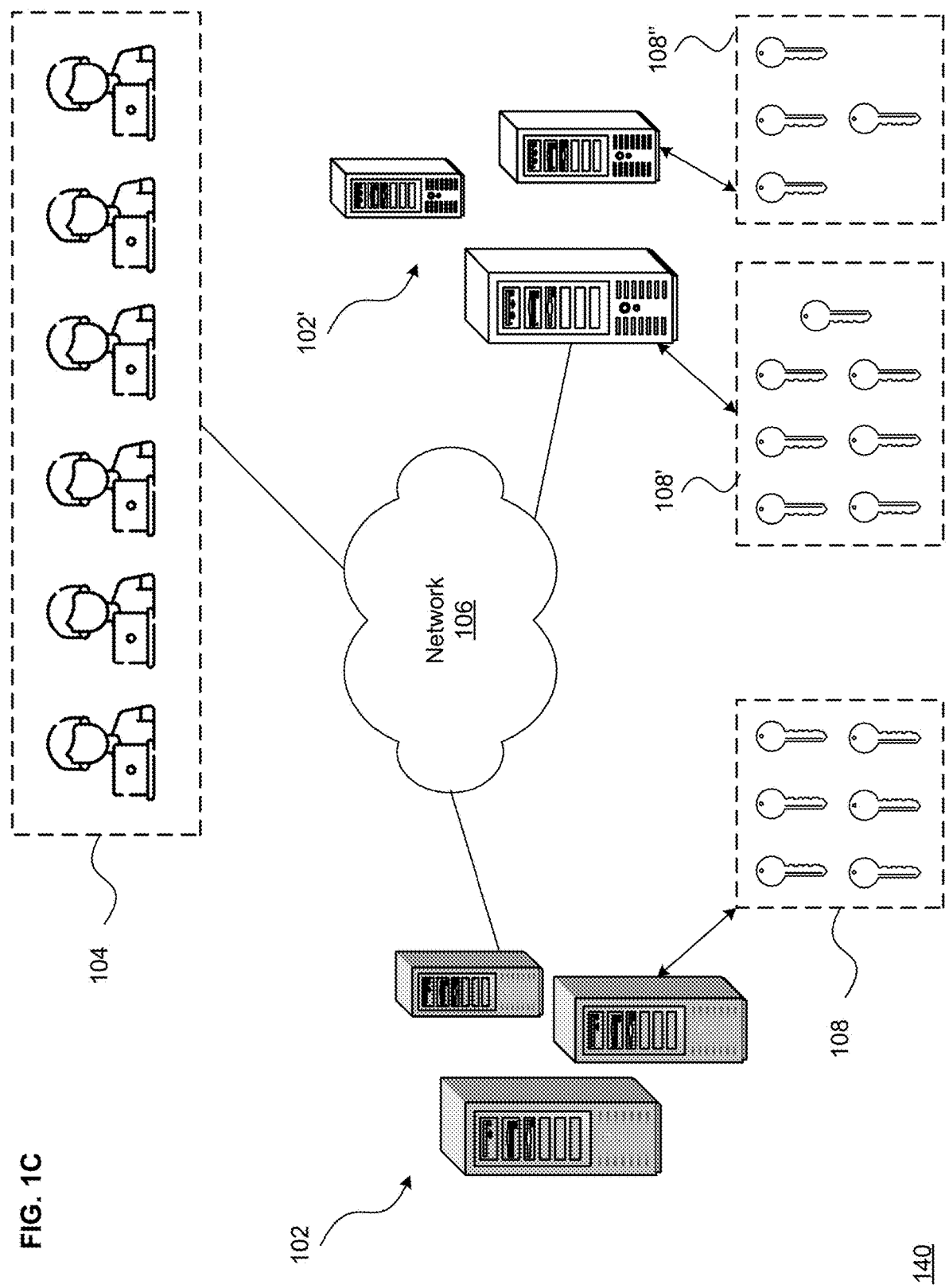

The technology discussed herein provides a constant-time, consistent range-hashing approach, referred to herein as a "flip hash", that is particularly beneficial in database and load rebalancing applications due to its low computational cost and ease of implementation. For instance, as computing resources are added to a system such as a set of servers, keys are able to be remapped evenly across the newly added resources. This enables upscaling of the system to spread possible hotspots across multiple ones of the added computing resources.

In large databases, data may be required to be horizontally partitioned into a number of resources, e.g., shards, that can be indexed by a range of integers from 0 to n-1, that varies over time to ensure that the overall system scales with the amount of data. As the number of shards changes, it is desirable to keep the amount of data that is shuffled across shards as small as possible. Specifically, it may be preferable that as one shard is added, a minimal 1/(n+1) share of the data is redistributed from each of the previously existing shards to the newly added shard to maintain the balanced distribution of data across shards. In addition, no data should be unnecessarily shuffled across the previously existing shards. Given that mapping keys to shards is an operation that has to be performed on every insert, it is important for this mapping to be as computationally cheap as possible. Note that other operations may also involve the mapping, such as checking whether an element (e.g., a key) is present in the database. Consistent range-hashing is a technique that provides a solution to this problem, and the flip hash approach addresses these particular constraints.

Consistent hashing aims at mapping keys to a variable set of nodes or resources (e.g., web servers, shards, etc.) while ensuring both monotonicity and balance. Monotonicity may be referred to in different ways, e.g., as minimal disruption, stability, resilience to backend changes, remapping property, or simply consistency. Regardless of the terminology, monotonicity is the property of a hash function that minimizes the number of keys being remapped to a different bucket when the set of buckets varies. Balance, also referred to as load balancing, uniform balance, uniform load balancing or uniformity, is achieved when the keys are hashed evenly across buckets.

Consistent hashing relies on the concept of a ranged hash function, which in addition to the key takes as input the set of resources that the hash function may hash the key to. In practice, that subset designates the set of nodes that are active in the pool at some point. Consistent hashing is particularly relevant when both the cost of shuffling keys across resources is high and individual resources cannot be overloaded. It may be employed in the contexts of distributed caching, load balancing, and distributed databases. Various consistent hashing solutions have been previously proposed, each with their own tradeoffs.

A focus here is on the class of problems that allow for the sequential indexing of the set of resources, from 0 to some variable integer n-1. This is referred to herein as consistent range-hashing. In other words, resources may be added at will, and some keys will be remapped to them so as to maintain balance. However, arbitrary resource removals are not allowed, and only the last added resource can be removed. Adding this restriction enables the better fulfillment of the monotonicity and balance properties, with computational and memory cost lower than those of the solutions to the more general consistent hashing problem mentioned above.

Database applications, where a keyspace needs to be hashed evenly to a variable number of shards that are backed by multiple replicas, are of particular importance for consistent-range hashing. This resource redundancy avoids the need for dealing with arbitrary resource loss in the hashing algorithm itself.

With regard to indexing, the flip hash approach accounts for the particular situation where the resources can be indexed by ranges of the form $[n]=\{0, \ldots, n-1\}$ with $n \in \mathbb{N}^*$. The hash function is of the form $f: X \times \mathbb{N}^+ \to \mathbb{N}$ where $f(x,n) \in [n]$ for all keys x and all $n \in \mathbb{N}^*$. This function can provide the properties of monotonicity and regularity that formalize consistency and balance, which are defined as follows.

Monotonicity

A function $f$ is monotone if, for all $x \in X$ and $n, n' \in \mathbb{N}^*$ with $n<n'$, $f(x, n')<n$ implies $f(x, n')=f(x, n)$. Monotonicity is the property that as one changes the hash table (the set of values that the function may hash to), keys may not be remapped across hash values that were part of the hash table both before and after resizing the hash table.

Before stating the next definitions, the following notation is introduced: for a, b $\in \mathbb{R}$ and $\epsilon \in [0, 1)$, the following can be written:

$$a \underset{\approx}{\overset{\epsilon}{\approx}} \text{ if } b(1-\epsilon) \leq a \leq b(1+\epsilon)$$

Regularity

Let $\epsilon \in [0, 1)$. Here, $f$ is $\epsilon$-regular if for all $n \in \mathbb{N}^*$ and $z \in [n]$, $$\Pr_{x \in X}(f(x, n) = z) \underset{\approx}{\overset{\epsilon}{\approx}} \frac{1}{n}$$

Regularity formalizes load balance, or the uniform distribution of keys across resources. Given that a key is drawn uniformly at random, it is equally likely to be hashed to any of the hash values as one another. One can use $\epsilon$-regularity to sweep aside the case where the number of keys is finite and is not a multiple of the number of distinct hash values by setting $\epsilon \geq 1/|X|$.

The property of $(\epsilon, k)$-wise independence of a family of hash functions of the form $h:\Sigma \to \mathcal{R}$ can be used, which is defined as follows. Let $\epsilon \in [0, 1)$ and $k \in \mathbb{N}$. A hash family $\mathcal{H} = \{h:\Sigma \to \mathcal{R}\}$ is $(\epsilon, k)$-wise independent if $\mathcal{R}$ is finite and, for all pairwise distinct $\sigma_1, \ldots, \sigma_k \in \Sigma$ and for all $z_1, \ldots, z_k \in \mathcal{R}$:

$$\Pr_{h \in \mathcal{H}}\left(\wedge_{i=1}^k h(\sigma_i) = z_i\right) \underset{\approx}{\overset{\epsilon}{\approx}} \frac{1}{|\mathcal{R}|^k}$$

Observe that $(\epsilon, k)$-wise independence implies $(\epsilon, l)$-wise independence for all integers $l \leq k$.

Flip Hash Approach

The flip hash approach builds upon any family of hash functions $\mathcal{H} = \{h_x: \to [2^q]\}_{x \in X}$ where $q \in \mathbb{N}$. It also assumes the existence of a way to build unique elements in $\Sigma$ from pairs of integers, specifically, of an injective function $\sigma: \{0, \ldots, q-1\} \times \{0, \ldots, m\} \to \Sigma$ for some integer m. The flip hash approach turns $\mathcal{H}$ and $\sigma$ into a function $f_{\mathcal{H},\sigma}: X \times \{2^r: r \in \{0, \ldots, q\}\} \to [2^r]$. It can be shown that under the hypothesis that $\mathcal{H}$ is $(\epsilon, k)$-wise independent, $f_{\mathcal{H},\sigma}$ is both monotone and $$O\left(\epsilon + \frac{1}{2^k}\right)$$

regular, hence providing stability and load balance. The choice of the hash family $\mathcal{H}$ and how $\sigma$ may be built in practice are discussed below.

How the flip hash process hashes a key $x \in X$ is discussed when the number of resources is a power of 2. The restriction of $f_{\mathcal{H},\sigma}$ to the ranges of the form $[2^r]$ for integers $r \leq q$ may be called $\tilde{f}_{\mathcal{H},\sigma}$. This can then be generalized to any range [n] with $n \leq 2^q$ by building $f_{\mathcal{H},\sigma}$ from $\tilde{f}_{\mathcal{H},\sigma}$. For simplicity, the subscript in the notation will be omitted, simply using $\tilde{f}$ and $f$, respectively.

First, consider the case where the number of resources n is a power of 2 Given a number of resources $n=2^r$ for some integer $r \leq q$, Algorithm 1 in FIG. 2 shows how a key $x \in X$ is hashed into one of the resources: $\tilde{f}(x, 2^r) \in [2^r]$. The algorithm, executed by one or more processors of a processing device (e.g., a routing server or other computing system). The process first hashes the key x and $\sigma(0, 0)$ using the underlying hash family $\mathcal{H}$ and keeps the r least significant bits in a. b records the position of the most significant bit of a that is equal to 1. x is then hashed again by the process, with $\sigma(b, 0)$ to generate a second hash, of which the b least significant bits are kept in c. Finally, c is used to flip some of the bits of the first hash a.

Given some x, $\mathcal{H}$, and $\sigma$, that can produce specific values of $h_x(\sigma(b, 0))$, the behavior of Algorithm 1 as r increases is illustrated in Table 1 of FIG. 3. As an example, consider the case where the key x is first hashed into $h_x(\sigma(0, 0))=1011_2$, and where r=2. The value of $\sigma(0, 0)$ itself does not matter at this point. a is built from the 2 least significant bits of the hash: $a=0011_2$, and b=1. c contains the single least significant bits of the second hash, which could be, e.g., $c=0001_2$, and flips some of the bits of a to generate $\tilde{f}(x, 2^2)=0011_2 \oplus 0001_2=0010_2=2$. As one doubles the number of resources by incrementing r from 2 to 3, it happens that the additional bit of $h_x(\sigma(0, 0))$ that is being used to build a is 0. a therefore stays the same, as do b, c, and the final flipped hash value $\tilde{f}(x, 2^3)=0010_2=2$. However, incrementing r once more from 3 to 4 changes the value of a from $0011_2$ to $1011_2$. It follows that b=3 and the second hash differs from the previous instance: c could now be $0101_2$. Finally, the key x is hashed to a new value $\tilde{f}(x, 2^4)=1011_2 \oplus 0101_2=1110_2=14 \geq 2^3$.

In this particular instance, it is to be noted that as the number of resources is gradually increased, the hash stays the same ($\tilde{f}(x, 2^3)=\tilde{f}(x, 2^2)$) or is updated to map to one of the newly added resources ($\tilde{f}(x, 2^4) \geq 2^3$). This is an illustration of the monotonicity of $\tilde{f}$, which the following theorem states to be generally ensured.

Theorem: $\tilde{f}$ is monotone. It is enough to show that, for all $r \in \{0, \ldots, q\}$ and $x \in X$, incrementing r by one either leaves the hash unchanged or updates it to a value that could not be reached before, i.e., greater than or equal to $2^r$. Incrementing r by one may only affect a by updating its (r+1)-th least significant bit from 0 to either 0 or 1. If the bit stays 0, then a, b and c are all unchanged, and $\tilde{f}(x, 2^{r+1})=\tilde{f}(x, 2^r)$. Otherwise, the bit is changed to 1, b=r, and the (r+1)-th least significant bit of a $\oplus$ c is 1, thus $\tilde{f}(x, 2^{r+1}) \geq 2^r$.

Next the regularity of $\tilde{f}$ is shown, i.e., $\tilde{f}(x, 2^r)$ is uniform over $[2^r]$ given that the key x is picked uniformly at random. Requiring $h_x((0, 0))$ to be uniform given that x is picked at random is not enough, because the second hash used for c could depend on the first hash used for a in a way that favors some values of a $\oplus$ c over others. For instance, consider the extreme case where every $h_x$ is a constant function independent of $\sigma$, which would cause the last significant bits of a $\oplus$ c to always be 0). Therefore, independence between $h_x(\sigma(0, 0))$ and $h_x(\sigma(b, 0))$ is required, which can be ensured with the pairwise independence of the hash family H. This is formalized in the following corollary: let $\epsilon \in [0, 1)$ and let $\mathcal{H}$ be $\epsilon$-pairwise independent. Then, $\tilde{f}$ is $\epsilon$-regular.

When generalizing the approach to any value of n rather than only powers of 2, what is needed is more than the regularity of $\tilde{f}$. Here, the following lemma can be leveraged. It informally states that the increasing hash values produced by $\tilde{f}$, as the range of possible values $[2^r]$ grows, along with those produced by $\mathcal{H}$, across distinct seeds, are all mutually independent. In particular, this implies that when increasing the number of resources, the keys that were mapped to a single resource and get remapped to new resources are spread across all the new resources, which makes upscaling resources likely to spread hotspots across a large number of resources, rather than only moving them to single new resources.

More particularly, the lemma states the following. Let $\epsilon \in [0, 1)$, $k_{\tilde{f}} \in \mathbb{N}$, $k_h \in \mathbb{N}$, and let $\mathcal{H}$ be $(\epsilon, k_{\tilde{f}}+k_h+1)$-wise independent. Let $r_1, \ldots, r_{k_{\tilde{f}}} \in \{0, \ldots, q\}$, and $z_1, \ldots, z^{\tilde{f}} \in [2^q]$, such that:

$$z_1 < 2^{r_1} \leq z_2 < \ldots < 2^{r_{k_{\tilde{f}}}}$$

Let $\rho_1, \ldots, \rho_{ph} \in \Sigma \setminus \{(\sigma b, 0) : b \in \{0, \ldots, q-1\}$ distinct, and $$\eta_1, \ldots, \eta_{k_h} \in [2^q].$$

Then:

$$\Pr_{x \in X}\left( \wedge_{i=1}^{k_{\tilde{f}}} \tilde{f}(x, 2^{r_i}) = z_i \wedge \wedge_{i=1}^{k_h} h_x(\rho_i) = \eta_i \right) \approx \frac{\epsilon}{2^{\sum_{i=1}^{k_{\tilde{f}}} r_i + qk_h}}$$

As a proof, let P be the probability of the left-hand side of the equality and let l: a→[$\log_2$ a] if a>0, else 0. Because c only flips the bits after the most significant 1 bit of a, $l(a \oplus c)=l(a)$. Similarly, for all integers $\zeta$, $l(z_i \oplus (\zeta \mod 2(z_i))=l(z)$. Thus, for $i=\{1, \ldots, k_{\tilde{f}}\}$, one can replace l(a) with $l(z_i)$. $\tilde{f}(x, 2^{r_i})=z$; if and only if:

$$(h_x(\sigma(0,0)) \mod 2^{r_i}) \oplus h_x(\sigma(l(z_i),0)) \mod 2^{l(z_i)}=z_i.$$

It is possible to express P as a sum of probabilities as follows:

$$P = \sum_{(\theta_0, \ldots, \theta_{k_{\tilde{f}}}) \in \Theta} \Pr_{x \in X}(h_x(\sigma(0, 0)) =$$

$$\theta_0 \wedge \wedge_{i=1}^{k_{\tilde{f}}} h_x(\sigma(l(z_i), 0)) = \theta_i \wedge \wedge_{i=1}^{k_h} h_x(\rho_i) = \eta_i),$$

with $$\Theta = \left\{ (\theta_0, \ldots, \theta_{k_{\tilde{f}}}) \in [2^q]^{k_{\tilde{f}}+1} : \forall i \in \{1, \ldots, k_{\tilde{f}}\}, \right.$$

$$\left. (\theta_0 \mod 2^{r_i}) \oplus (\theta_i \mod 2^{l(z_i)}) = z_i \right\}$$

Where $l(z_i)$ is equal to zero if and only if $z_i=0$ or 1, which may happen if i=1 or 2. Let $J=\{i \in \{1, \ldots, k_{\tilde{f}}\}: l(z_i)=0\}$. Observing that for all $i \in J$, the inner conjunction implies $\theta i=\theta_0$, P can be rewritten as:

$$P = $$

$$\sum_{(\theta_i) \in \Theta \cap \Lambda_J} \Pr_{x \in X}\left( h_x(\sigma(0, 0)) = \theta_0 \wedge \bigwedge_{\substack{i=1 \\ l(z_i) \neq 0}}^{k_{\tilde{f}}} h_x(\sigma(l(z_i), 0)) = \theta_i \wedge \bigwedge_{i=1}^{k_h} h_x(\rho_i) = \eta_i \right).$$

with $$\Lambda_J = \left\{ (\theta_0, \ldots, \theta_{k_{\tilde{f}}}) \in [2^q]^{k_{\tilde{f}}+1} : \forall i \in J, \theta_i = \theta_0 \right\}$$

Each term is the probability of the conjunction of at most $k_{\tilde{f}}+k_h+1$ events of the form $h_x(\sigma_j)=\mu_j$ with pairwise distinct $\sigma_j$. Because $\mathcal{H}$ is $(\epsilon, k_{\tilde{f}}+k_h+1)$-wise independent:

$$P \approx \frac{\epsilon}{2^{q(1+k_{\tilde{f}}-|J|+k_h)}} |\Theta \cap \Lambda_J|.$$

It remains to calculate $|\Theta \cap \Lambda_J|$. For all i, $(\theta_0 \mod 2^{r_i}) \oplus (\theta_i \mod 2^{l(z_i)})=z_i$ implies: 1 $(\theta_0 \mod 2^{r_i})=l(z_i)\oplus(\theta i \mod 2^{l(z_i)}))=l$ (zi), i.e., any bit of $\theta_0$ of index between $l(z_i)$ (excluded) and $r_i$ (included) is equal to zero. Given that $l(z_1)<r_1 \leq l(z_2) < \ldots < r_{k_{\tilde{f}}}$ by hypothesis, there are:

$$2^q = \sum_{i=1}^{k_{\tilde{f}}} (r_i - l(z_i))$$

values of $\theta_0$ in $[2^q]$ that have this property for all i. For all such $\theta_0$, and for all i, there are $2^{q-l(zi)}$ values of $\theta i$ in $[2^q]$ such that $(\theta_0 \mod 2^{ri}) \oplus (\theta_i \mod 2^{l(zi)}) = z_i$. All things considered:

$$|\Theta \cap \Lambda_J| = 2^{q-\sum_{i=1}^{k_f}(r_i - l(z_i))} \prod_{\substack{i=1 \\ i \notin J}}^{k_f} 2^{q-l(z_i)} = 2^{q(1+k_f - |J|) - \sum_{i=1}^{k_f} r_i}.$$

And P reduces to:

$$P \stackrel{\epsilon}{\approx} \frac{1}{2^{\sum_{i=1}^{k_f} r_i + q k_h}}.$$

It is possible to generalize the flip hash approach to any number of resources $n \leq 2^q$. Algorithm 2 in FIG. 4 shows the generalization. This algorithm, which may be implemented by one or more processor as with Algorithm 1, leverages Algorithm 1 (FIG. 2) using the power of 2 immediately greater than or equal to n, $2^r$. As shown, Algorithm 2 has a set of return statements (A, B, C, and D).

If the value that Algorithm 1 returns is within the accepted range [n], it is returned with the return statement (A). Otherwise, the algorithm repetitively hashes the key x with varying values $\sigma(r-1, i)$ until one of the hashes, masked to the least r significant bits, is within the range [n]. At this point, it either returns it with (C) when it is greater than or equal to $2^{r-1}$, or return with (B) the value that Algorithm 1 generates with the previous power of 2. The latter case ensures monotonicity. The number of iterations is also bounded by m to ensure that the algorithm terminates, without any assumptions on $\mathcal{H}$.

Given some x, $\mathcal{H}$, and $\sigma$, that may produce the same specific values of $h_x(\sigma(b, i))$ as the ones of Table 1, Table 2 in FIG. 5 illustrates the behavior of Algorithm 2 for successive values of n. Thus, it can be seen that Algorithm 2 builds on the monotonicity of Algorithm 1 and itself ensures monotonicity.

Proof. It is enough to show that, for all $x \in X$ and $n \in \{1, \ldots, 29\}$, $f(x, n+1) = f(x, n)$ or $f(x, n+1) = n$. By construction, $n \leq 2^n$.

If $n \leq 2^r$, incrementing n leaves r, therefore d, unchanged: $r' = r$ and $d' = d$, where primed variables denote the values of the variables when the algorithm is run with $n' = n+1$ as an input.

If $d < n'$, then $f(x, n') = d' = d$ by return statement (A). If $d < n$, then $f(x, n') = d = f(x, n)$. Otherwise (else) $d = n$, and $f(x, n') = d = n$.

Running the algorithm with either n or n' leads to the top-level "else" branch. For convenience, one can define $e_{m+1} = e'_{m+1} = 0$ so that the return statement (D) is equivalent to an additional loop iteration with $i = m+1$. Because $2^{r-1} < n \leq n'$, the loop iterates until $e_i < n$, respectively, $e_i' < n'$. Let $i_0$ (resp., $i_0'$) be the lowest $i \in \{1, \ldots, m+1\}$ such that $e_i < n$ (resp., $e_i < n'$). Because $r' = r$, then $e_i' = e_i$; for all $i \in \{1, \ldots, m\}$, and t $i_0' \leq i_0$. Here, if $i' = i_0$, either $f(x, n') = f(x, 2^r) = f(x, n)$ by return statement (B), or $f(x, n') = ei_0 = f(x, n)$ by return statement (C). Else, $i_0' < i_0$, hence $$n \leq e_{i'_0} < n'$$

and $$e_{i'_o} = n > 2^{r-1}.$$

It follows that $$f(x, n') = e_{i'_o} = n$$

by return statement (C).

Else, when $n = 2^r$, and $r' = r+1$. Because $d < 2^r = n$, $f(x, n) = d = f(x, 2^r)$ by return statement (A). If $d' = d$, because $d' = d < n \leq n'$, then by return statement (A), $f(x, n') = d' = d = f(x, n)$. Else, because $f$ is monotone, $d' \geq 2^r = n$. If $d' = n$, because $d' < n'$, then by return statement (A), $f(x, n') = d' = n$.

For else, d' n', with $i_0'$ as defined above, if $$e_{i'_o} < 2^{r'-1},$$

then by return statement (B), $f(x, n') = \tilde{f}(x, 2^{r'-1}) = f(x, 2^r) = f(x, n)$. Else, because $$n = 2^{r'-1} \leq e_{i'_o} < n' = n+1, e_{i'_o} = n.$$

It follows that by return statement $$(C), f(x, n') = e_{i'_o} = n.$$

The regularity properties of the flip hash approach are shown by the following theorem. Theorem: provided that $\mathcal{H}$ is ($\epsilon$, k)-wise independent with $\epsilon \in [0, 1)$ and $k \geq 3$, the flip hash approach, as defined by Algorithm 2 with $$m = k - 3, \text{ is } O\left(\epsilon + \frac{1}{2^k}\right)$$

-regular. Proof.

Let $z \in [n]$. The probability that Algorithm 2 returns z is the sum of the probabilities that each of its return statements is reached and returns z:

$$\Pr_{x \in X}(f(x, n) = z) = A + \sum_{i=1}^{m}(B_i + C_i) + D$$

The return statement (A) is reached if and only if $d = f(x, 2^{r-1}) < n$, in which case d is returned. Thus:

$$A = \Pr_{x \in X}(\tilde{f}(x, 2^r) < n \wedge \tilde{f}(x, 2^r) = z)$$
$$= \Pr_{x \in X}(\tilde{f}(x, 2^r) = z)$$
$$\stackrel{\epsilon}{\approx} \frac{1}{2^r}.$$

where the second relation follows from the hypothesis $z < n$, and the last relation follows from the $\epsilon$-regularity of $f$.

The return statement (B) only produces values in $[2^{r-1}]$. Therefore, if $z \geq 2^{r-1}$, then for all $i \in \{1, \ldots, m\}$, $B_i=0$. Otherwise, $z < 2^{r-1}$, and $B_i$ can be expressed from the successive predicates that need to evaluate to true to lead to the return statement (B) at the i-th iteration:

$$B_i = \Pr_{x \in X}\left(\tilde{f}(x, 2^r) \geq n \wedge \bigwedge_{j=1}^{i-1} e_j(x) \geq n \wedge e_i(x) < 2^{r-1} \wedge \tilde{f}(x, 2^{r-1}) = z\right),$$

where for $j \in \{1, \ldots, m\}$, $e_j(x) = h_x(\sigma(r-1,j)) \mod 2^r$. Because $\sigma$ is injective, the lemma with $k_{\tilde{f}}=2$ and $k_h=i<m$, together with the law of total probability, allow for rewriting $B_i$ as the product of the probabilities of the individual events:

$$B_i \overset{\epsilon}{\approx} \frac{2^r - n}{2^r}\left(\prod_{j=1}^{i-1}\frac{2^r - n}{2^r}\right)\frac{2^{r-1}}{2^r}\frac{1}{2^{r-1}} = \frac{1}{2^r}\left(1 - \frac{n}{2^r}\right)^i.$$

The same approach is taken for the return statement (C), which does not produce values in $[2^{r-1}]$. Therefore, if $z < 2^{r-1}$, then for all $i \in \{1, \ldots, m\}$, $C_i=0$. Otherwise, $z \geq 2^{r-1}$, and $C_i$ can be written as:

$$C_i = \Pr_{x \in X}\left(\tilde{f}(x, 2^r) \geq n \wedge \bigwedge_{j=1}^{i-1} e_j(x) \geq n \wedge 2^{r-1} < n \wedge e_i(x) = z\right).$$

Likewise, the aforementioned lemma with $k_{\tilde{f}}=1$ and $k_h=i \leq m$ gives:

$$C_i \overset{\epsilon}{\approx} \frac{2^r - n}{2^r}\left(\prod_{j=1}^{i-1}\frac{2^r - n}{2^r}\right)\frac{1}{2^r} = \frac{1}{2^r}\left(1 - \frac{n}{2^r}\right)^i.$$

Observing that this is the same expression as $B_i$ when $z < 2^{r-1}$, the sum of $B_i$ and $C_i$ forms a geometric series. Using the closed-form formula for the sum of its first terms:

$$\sum_{i=1}^{m}(B_i + C_i) \overset{\epsilon}{\approx} \frac{1}{2^r}\sum_{i=1}^{m}\left(1 - \frac{n}{2^r}\right)^i$$

$$= \left(\frac{1}{n} - \frac{1}{2^r}\right)\left(1 - \left(1 - \frac{n}{2^r}\right)^m\right)$$

$$= \left(\frac{1}{n} - \frac{1}{2^r}\right)\left(1 + O\left(\frac{1}{2^m}\right)\right),$$

where the last relation uses the facts that $2^{r-1} < n \leq 2^r$.

Finally, D can be written as:

$$D = \Pr_{x \in X}\left(\tilde{f}(x, 2^r) \geq n \wedge \bigwedge_{i=1}^{m} e_i(x) \geq n \wedge \tilde{f}(x, 2^{r-1}) = z\right).$$

Here, the aforementioned lemma with $k_{\tilde{f}}=1$ and $k_h=m$ gives:

$$D \overset{\epsilon}{\approx} \left(\frac{2^r - n}{2^r}\right)^m \frac{1}{2^{r-1}}$$

$$= \frac{1}{2^{r-1}}\left(1 - \frac{n}{2^r}\right)^m$$

$$= \frac{1}{n}O\left(\frac{1}{2^m}\right).$$

The probabilities matching every return statement can be combined, so that:

$$\Pr_{x \in X}(f(x, n) = z) \overset{\epsilon}{\approx} \frac{1}{2^r} + \left(\frac{1}{n} - \frac{1}{2^r}\right)\left(1 + O\left(\frac{1}{2^m}\right)\right)$$

$$= \frac{1}{n}\left(1 + O\left(\frac{1}{2^m}\right)\right).$$

By definition of $\overset{\epsilon}{\approx}$, and because $k=m+3$, the $$O\left(\epsilon + \frac{1}{2^k}\right)$$

regularity of $f$ is proven by:

$$\Pr_{x \in X}(f(x, n) = z) = \frac{1}{n}\left(1 + O\left(\frac{1}{2^k}\right)\right)(1 + O(\epsilon))$$

$$= \frac{1}{n}\left(1 + O\left(\epsilon + \frac{1}{2^k}\right)\right).$$

Moreover, provided that computing $\sigma$ is a constant-time operation, the time complexity of the flip hash approach is independent of n, as stated in the following theorem. Theorem: let c be the time complexity of $\mathcal{H}$. Provided that $\mathcal{H}$ is $(\epsilon, k)$-wise independent with $\epsilon \in [0, 1)$ and $k \in \mathbb{N}$, the time complexity of Algorithm 2 with $m \leq k$ is $O(c)$ on average and $O(mc)$ at worst (i.e., at the most complex). Proof. The worst-case complexity results from the fact that Algorithm 2 runs m for loop iterations at most. The probability that it runs exactly i iterations is upper-bounded by the probability that the first $i-1$ iterations each generate a value $e_j \in [2^r]$ such that $e_j \geq n$, itself upper-bounded by $$(1+\epsilon)\prod_{j=1}^{i-1}\frac{2^{r-1}}{2^r} = \frac{1+\epsilon}{2^{i-1}}$$

given that $\mathcal{H}$ is $(\epsilon, k)$-wise independent and $n > 2^{r-1}$. The average time complexity is therefore $$O\left(c(1+\epsilon)\sum_{i=1}^{m}\frac{i}{2^{i-1}}\right) = O(c).$$

Implementation

Implementing the flip hash approach utilizes the choice of a hash algorithm $\mathcal{H}$ that maps pairs of the keys in X of the desired type and the elements of 2, to integer values of (e.g., the 64-bit integer values $[2^{64}]$). The behavior and the performance of the flip hash depend on those of $\mathcal{H}$. Therefore, it is desirable to use a fast hash algorithm that evenly distributes keys in X over its hash table $[2^q]$, and is seeded by elements in $\Sigma$ across which it shows good hash mutual independence.

By way of example only, because of its computational performance, XXH3 is a suitable hashing algorithm that may be employed. Empirical validation was performed with statistical tests on the regularity of the flip hash approach when using XXH3, with m=64.

In addition, a standalone implementation was constructed that takes 64-bit integer keys as an input. It uses a customized hash algorithm $\mathcal{H}$ that takes inspiration from bit-mixing constructs, which enables a simple and fast implementation that also empirically showed the expected regularity. This standalone version can also be used to consistently hash keys of any type by taking as an input the integer output of any hash algorithm, including XXH3.

While it is not possible to make the hash independent of the input (e.g., key, seed, bit length and iteration index), given that it is deterministically calculated from this input, the goal of this construct is informally to make the hash show independence as much as possible by realizing the avalanche effect with the implementation. In other words, a small change in any part of the input (e.g., flipping a bit) should significantly change the hash to obtain a completely different value that looks independent of the previous one. The customized hash algorithm $\mathcal{H}$ uses three operations that are relatively computationally efficient to evaluate, namely XOR, bit shift and multiplication, and that help to realize the avalanche effect. The multiplication tends to propagate changes toward the most significant bits, whereas shifting right and then XORing tends to propagate changes to least significant bits. By running those operations on all the input, the process builds a hash function that empirically exhibits the properties of independence that are expected when used in Flip Hash.

This standalone implementation has the benefit of hashing the initial input only once and offers a performance gain if the input itself is large. Thus, instead of a single hash algorithm (e.g., XXH3) that hashes from T to $[2^{64}]$ and that needs to be run multiple times to evaluate Flip Hash, one can hash once from T to $[2^{64}]$ (which could be done using XXH3 or another hash algorithm), and then run $\mathcal{H}$ on the output to hash from $[2^{64}]$ to $[2^{64}]$ evaluate Flip Hash. $\mathcal{H}$ may be run two or more times.

The construction of the injective function $\sigma: \{0, \ldots, q-1\} \times \{0, \ldots, m\} \to \Sigma$ is discussed as follows. Hash algorithms may be seeded with integers that have at least a selected number of bits. In one scenario, this may be 32 bits (or more or less). Here, both q and m may be less than $2^{16}$. Thus, the approach may therefore use $\sigma:(r, i) \mapsto r+i2^{16}$. In addition, once can use $\sigma$ to make the flip hash itself seeded, by using $\sigma_s:(r, i) \mapsto (r+i2^{16}) \oplus s$, where s is the seed.

Test Results

Figure 6:
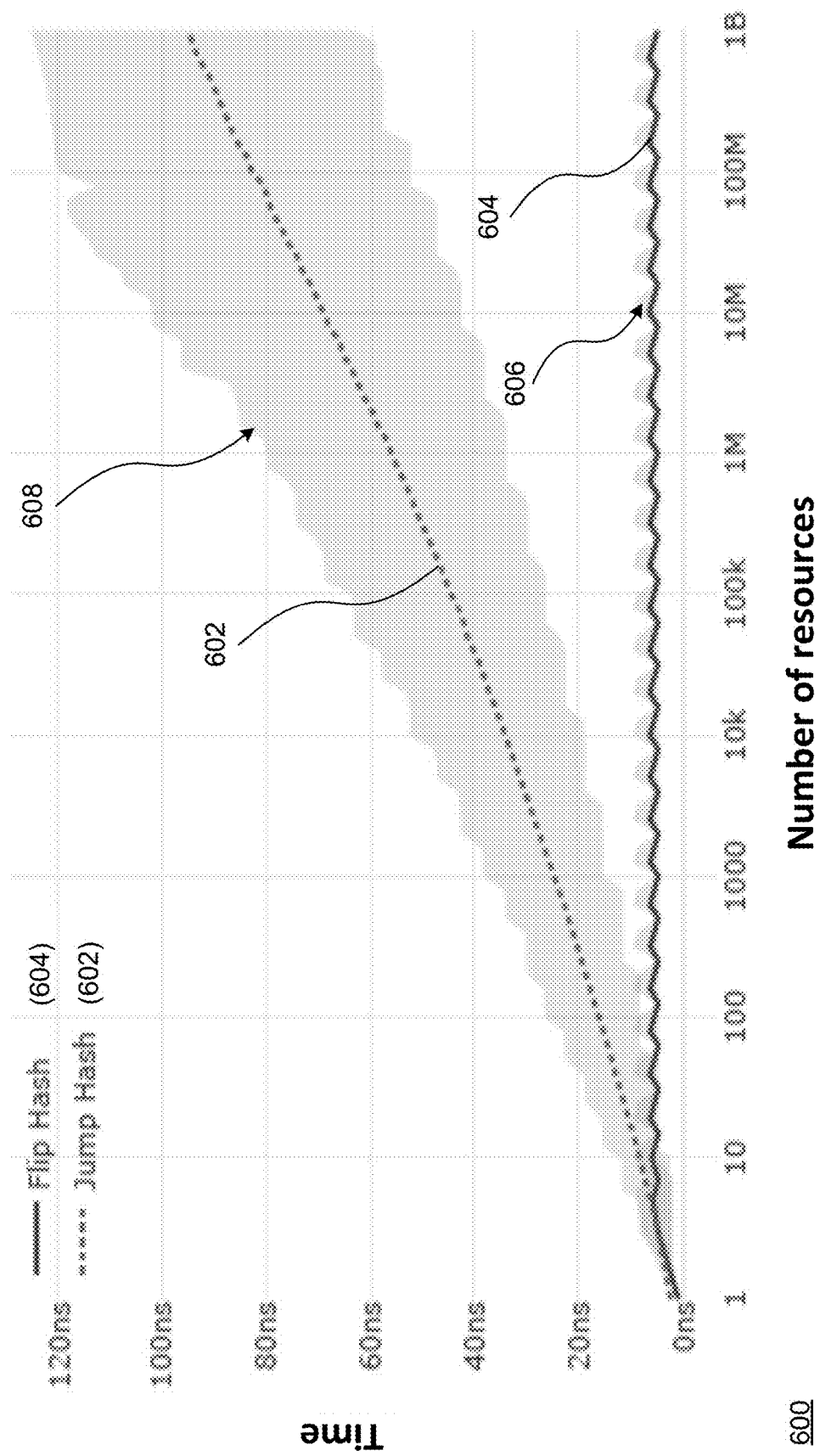
FIG. 6 illustrates a plot of test results comparing a number of resources and evaluation time according to aspects of the technology.

FIG. 6 is a chart 600 showing the evaluation times of a flip hash approach (done on the stand-alone approach described above, with randomly generated 64-bit integers as an input) and another approach called "Jump Hash" on an Intel Xeon 8375C CPU, for numbers of resources between one and one billion. The Jump Hash approach is described by Lamping, and Veach in "A Fast, Minimal Memory Consistent Hash Algorithm", CoRR, 2014, the entire disclosure of which is incorporated by reference herein. As shown, FIG. 6 plots the number of resources (x-axis, from 1 to 1 billion resources) against time (y-axis, from 0 ns to 120 ns). The dotted line 602 indicates the results for Jump Hash, while the solid line 604 indicates the results for the flip hash approach.

In addition to the average evaluation time across keys shown by the lines 602 and 604, it shows the interdecile range, i.e., the range between the 10th and the 90th percentiles. The interdecile range is relevant as a measure of the evaluation time dispersion, given that the numbers of iterations that both Flip Hash and Jump Hash run in their internal loops vary across keys. In particular, the graph shows the constant asymptotic dependency on the number of resources of the evaluation time for Flip hash, as indicated by arrow 606 pointing to a first shaded area (interdecile evaluation wall time), and the logarithmic one for Jump Hash, as indicated by arrow 608 pointing to a second shaded area (interdecile evaluation wall time). As can be seen from this chart, the flip hash approach takes a few nanoseconds to hash a key on average, however large the number of resources. In contrast, the Jump Hash approach, while similarly fast for small numbers of resources (e.g., 10s or 100s of resources), requires tens of nanoseconds or more for larger numbers of resources.

Figure 7:
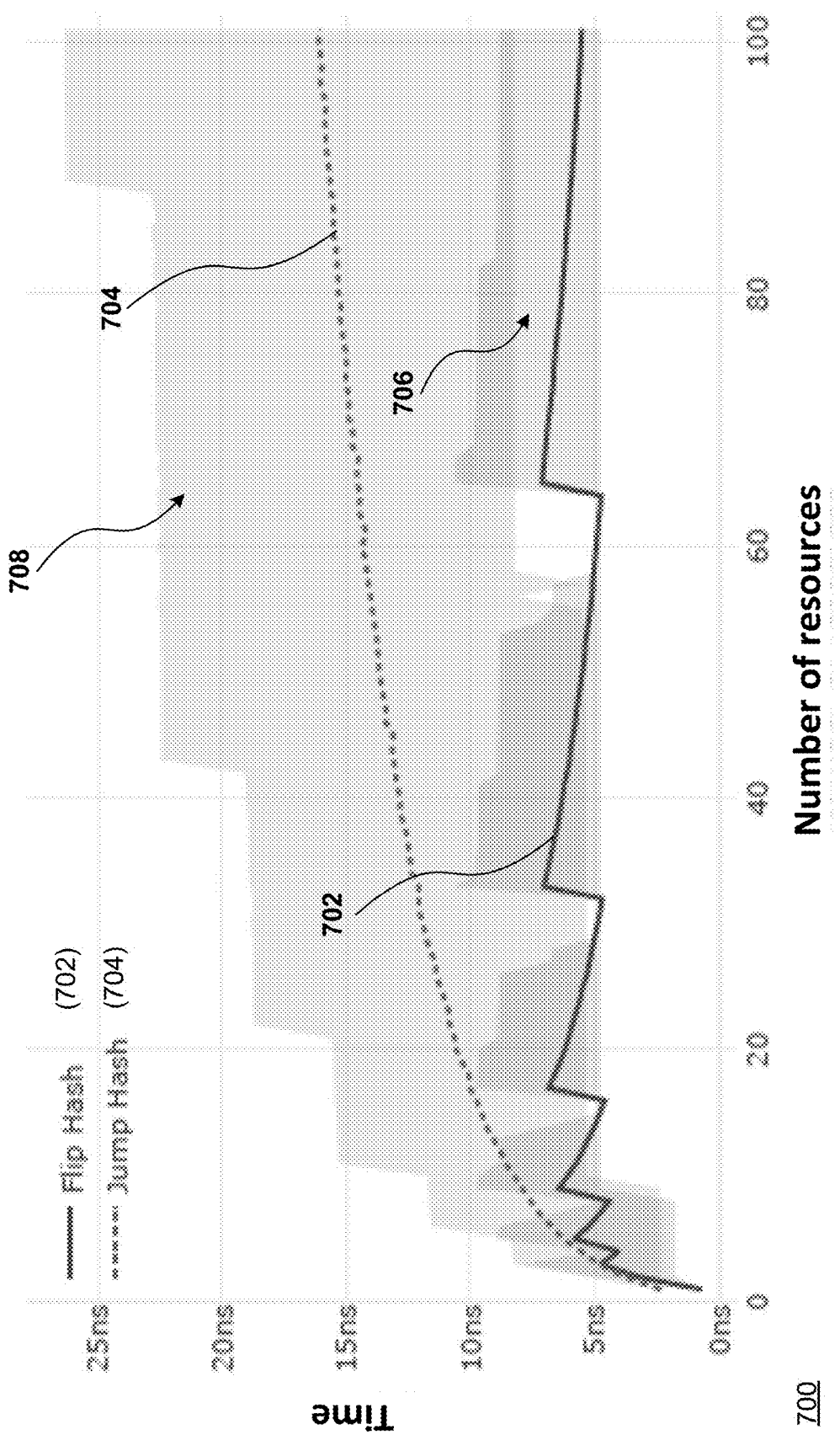
FIG. 7 illustrates a plot of test results comparing a small number of resources and evaluation time according to aspects of the technology.

FIG. 7 shows another chart 700, which focuses on hashing with fewer than 100 resources. This chart shows that the flip hash approach (solid line 702) is faster on average than Jump Hash (dotted line 704) when hashing with more than 10 resources, which is likely to be the case in the vast majority of applications. The graph also exhibits a characteristic "sawtooth" behavior of the evaluation time of the flip hash approach. This is because the farther away n is from the next power of 2, namely $2^r$, the more loop iterations the flip hash approach runs on average, given that both predicates d<n and e; <n in Algorithm 2 are less likely to evaluate to true. Here, the filled areas shown by arrows 706 and 708 are the interdecile evaluation wall times for the flip hash approach and the Jump Hash approach, respectively.

In addition to computational performance, the quality of the output of flip hash approach has been studied. Using Chi-Squared statistical tests, the validity of not only the regularity of the flip hash approach, but also its ability to generate mutually independent hashes when varying the seed, and mutually independent hashes when varying the number of resources, given that the hashes are pairwise distinct. The latter mutual independence implies or otherwise indicates that as resources are added, keys are remapped evenly across the newly added resources, which enables upscales to spread possible hotspots across multiple of the added resources.

Figure 8:
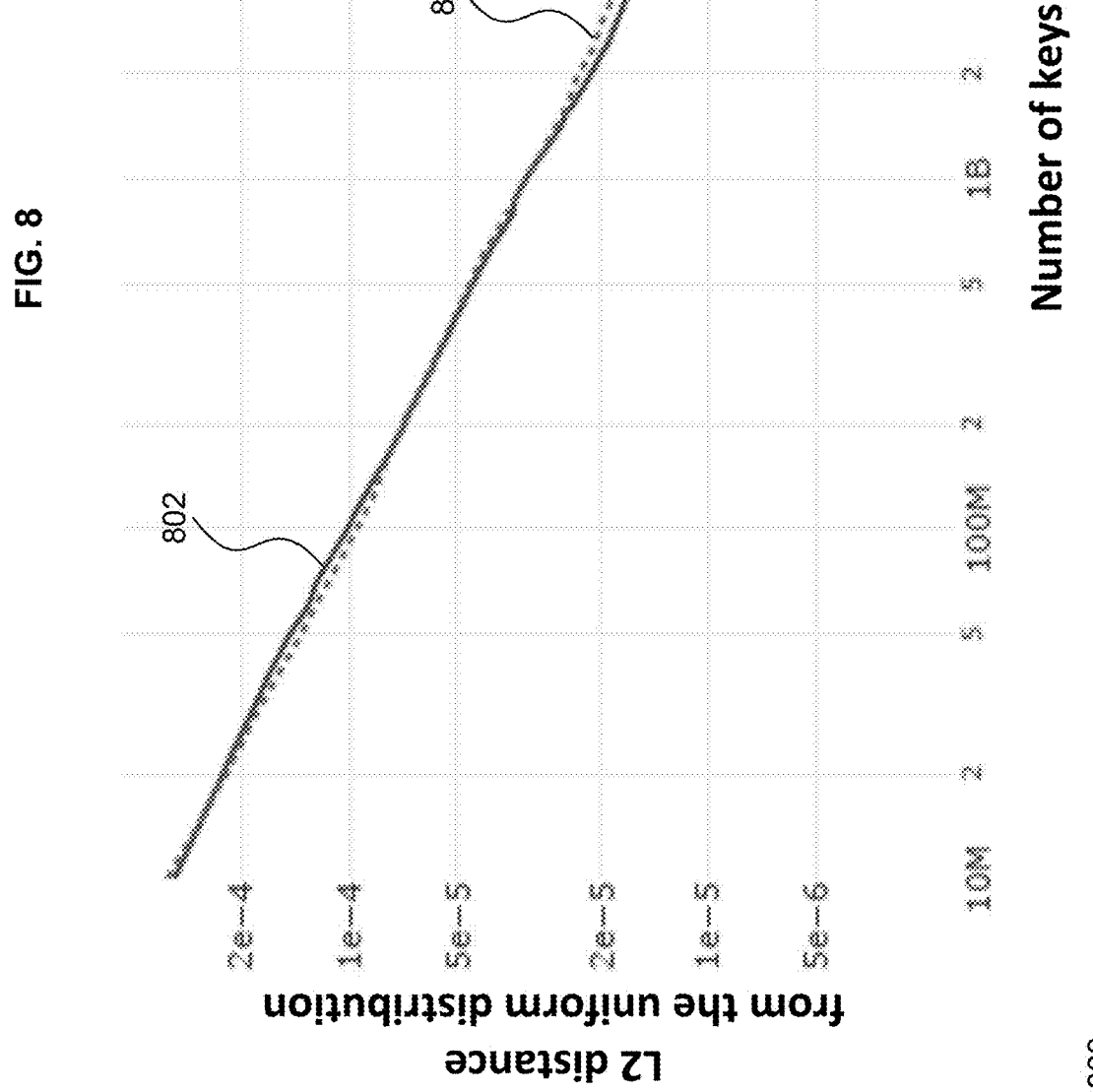
FIG. 8 illustrates a plot of the uniformity of key distributions across a set of resources in accordance with aspects of the technology.

As an illustration, chart 800 of FIG. 8 shows the comparable regularity of the flip hash approach (as shown by solid line 802) and the Jump Hash approach (as shown by dotted line 804) by hashing randomly generated keys and measuring the L2 distance between the resulting distribution of hashes and the uniform distribution.

EXAMPLE SYSTEM ARCHITECTURE

The flip hash approach may be particularly useful for uniformly distributing load over multiple servers when a single server cannot handle the full load. It is also useful through monotonicity because similar requests (where the requests have the same key) are consistently sent to the same server, which can cache results and avoid redundant processing when such similar requests are subsequently executed. Without that, similar requests may be sent to multiple servers and the same result may be cached in multiple servers, which is resource inefficient as it would use more storage overall than necessary.

Figure 9:
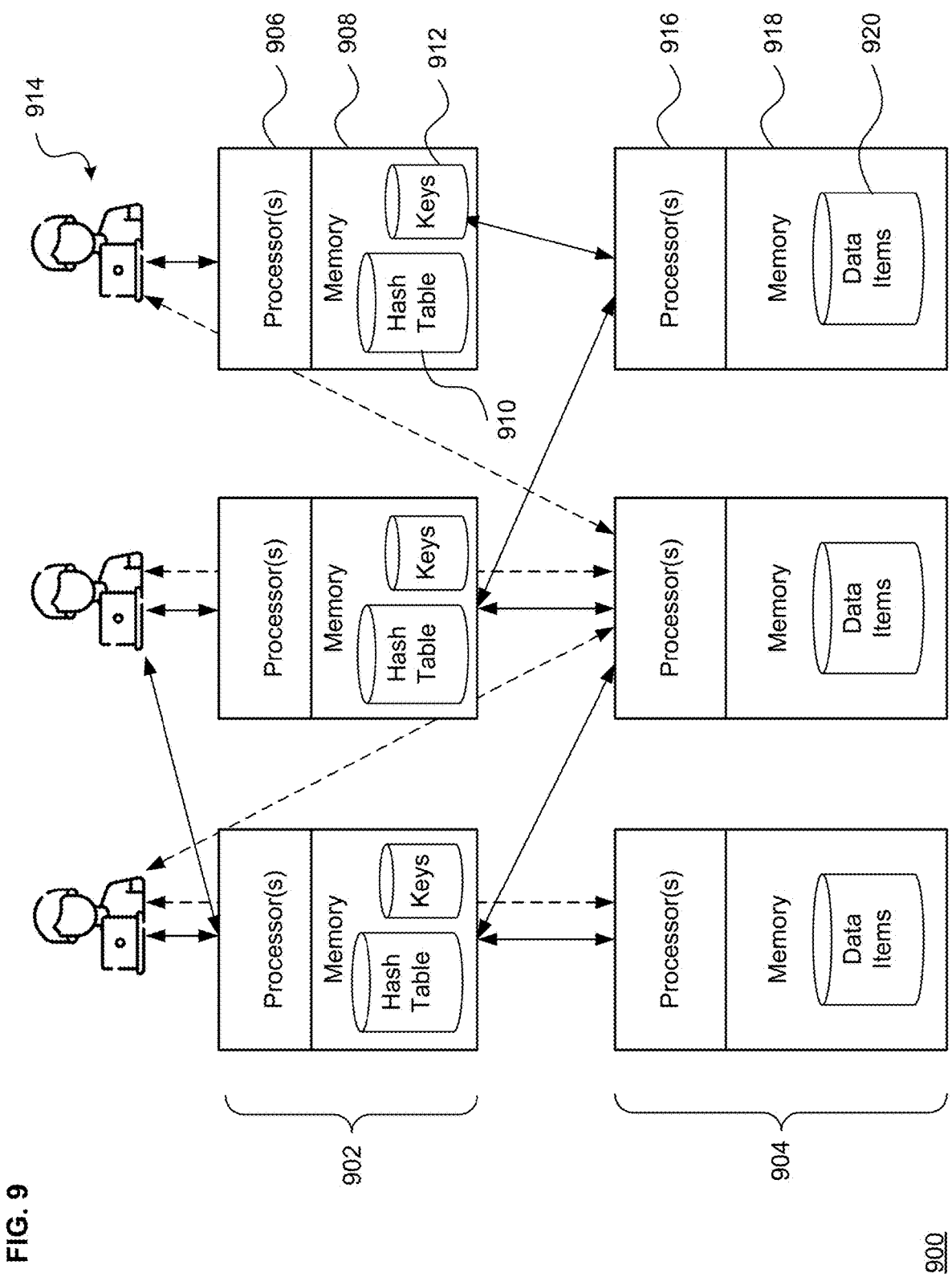
FIG. 9 is a system diagram in accordance with aspects of the technology.

FIG. 9 illustrates an example system architecture 900 that can implement the flip hash approach discussed herein. This example system architecture includes a first set of servers 902 and a second set of servers 904. The first set of servers may be, e.g., load-balancing/routing servers that maintain the flip hash information. The second set of servers 904 are "processing" servers that are configured to respond to the received requests. The servers 904 may be, e.g., web servers, database servers or storage devices that are configured to communicate with various client computing devices 914 (see dashed arrows). The serves 902 and/or 904 may be part of a single server rack, a server farm, a cloud-based server system or the like. The servers 902 forward incoming requests to respective ones of the servers 904. The routing to the servers 904 needs the properties of load balance and monotonicity because processing requests may be expensive and may require data that is only available locally on the servers 904. Hence the need for consistent hashing as discussed herein.

As shown, each server 902 includes one or more processors 906 and memory 908. The memory 908 may store instructions for implementing the flip hash algorithm(s) when executed by one or more of the processors 906. The memory in this example architecture also stores a hash table 910 in accordance with the flip hash approach, and also stores a set of keys 912. The key space is uniformly or otherwise evenly spread across the available servers 902. In particular, as discussed above, each server 902 can maintain approximately the same (or exactly the same) amount of keys in its respective set of keys as all of the other available servers.

By way of example, each server 902 may be configured to perform a first hash function on a key according to a first seed, in order to generate a first hash value having a fixed number of digits including a set of least significant bits and a set of most significant bits. Each server can then perform a second hash function on the key according to a second seed, in order to generate a second hash value having the fixed number of digits. Here, the second seed corresponds to a parameter of a given one of the most significant bits from the first hash value. Each server is configured to flip one or more of the set of least significant bits of the first hash value according to one or more least significant bits from the second hash value to generate a flipped hash, and identify, using the flipped hash, which one of a set of computing resources (e.g., which of servers 904) to assign a data element associated with the key. Then that server can assign the data element to the identified computing resource. Each server 902 may also hash the key with varying seed values at least one time until a hashing result, masked to a number of the least significant bits in the first hash value, is within the quantity of computing resources.

While the servers 902 may be in direct or indirect communication with one another, they need not share state information regarding their hash tables with one another. Because the flip hash approach is fully defined by its inputs, each server 902 may operate separately in an uncoordinated manner and still route data items or requests in the same way. Thus, in the above discussion, each server can individually perform the various flip hashing operations, and separately cording with the identified computing resource(s). Moreover, it may not matter to which server 904 each computing device 914 sends its data items or requests, because the routing servers 904 do not need to cache information and can effectively evaluate the flip hash on each data item or request that it receives from the computing devices 914. In addition, the device 904 that receives the request from a given computing device 914 may or may not need to know the key itself because it may be irrelevant to the nature of the processing operations to be performed by the device 904. In situations where the key is relevant, it can be attached to the request or the data item to avoid deriving the key multiple times.

As shown, each server 904 includes one or more processors 916 and memory 918. The memory 918 may store data items 920, which may include, by way of example only, information for responding to search requests, product information for online shopping, and/or other types of information that may be sent to the client computing devices 914.

The memories 908, 918 store information accessible by the corresponding processor(s) 906, 916. This can include instructions and data that may be executed or otherwise used by the processor(s), such as the flip hash algorithms discussed above. The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions may be any set of instructions to be executed directly (such as machine code) or indirectly (such as scripts) by the processor(s) 906, 916. For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The instructions may enable the processor(s) to perform any of the algorithms discussed above.

The processors 906, 916 may be any hardware-type processors, such as commercially available CPUs, TPUs, etc. Alternatively, each processor may be a dedicated device such as an ASIC or other hardware-based processor. Although FIG. 9 illustrates the processor(s) and memory of each processing device 902, 904 as being together, such devices may actually include multiple processors, computing devices, or memories that may or may not be stored within the same physical housing. Similarly, the memory may be a hard drive or other storage media located in a housing different from that of the processor(s), for instance in a cloud computing system. Accordingly, references to a processor or computing device will be understood to include references to a collection of processors or computing devices or memories that may or may not operate in parallel.

Moreover, reference to "one or more processors" herein includes situations where a set of processors may be configured to perform one or more operations. Any combination of such a set of processors may perform individual operations or a group of operations. This may include two or more CPUs or TPUs (or other hardware-based processors) or any combination thereof. It may also include situations where the processors have multiple processing cores. Therefore, reference to "one or more processors" does not require that all processors (or cores) in the set must each perform all of the operations. Rather, unless expressly stated, any one of the one or more processors (or cores) may perform different operations when a set of operations is indicated, and different processors (or cores) may perform specific operations, either sequentially or in parallel.

The example 900 of FIG. 9 illustrates a small number of devices 902, 904 and 914. In practice, there may be far more processing servers 904 than there are routing servers 902 (e.g., one or more orders of magnitude more processing servers 904 than routing servers 902), and there may be any number of client computing devices 914 (e.g., hundreds, thousands or more of such devices 914). In one scenario, there may be only one routing server 902 through which all requests from the client computing devices 914 are passed. There may be alternative configurations where the routing is done by devices 914 directly, without any routing server. Still other alternative configurations may also involve instances of devices 904 that do not perform any processing, but simply store the data that is received and provide such data on request (e.g., functioning as database shards).

In another example architecture, there may only be one set of servers. For instance, the set of servers may be able to implement flip hashing and serve data items to the client devices.

By way of example, each key may be derived from the contents of corresponding data items, or may be derived from metadata that is associated with that data item but is not included in the data item itself. For instance, an incoming data item (e.g., web request, log entry, etc.) may be associated with one or more metadata tags. The metadata tag(s) may be used as the key to identify which computing resource 904 (e.g., a web server or a storage server) will handle the data item, but the data item stored is absent the metadata. In one example, the key may include a combination of information internal and external to the data item, such as a customer name, organization ID, application or service name, host ID, header or footer of the data item, etc.

The interactions with the client computing devices 914 may be response to user interactions (e.g., search queries, browsing, clicking, purchasing actions of end user devices such as desktops, laptops, tablets, mobile phones, smartwatches, etc.). While not shown, the client computing devices 914 may include laptops or desktop computers, as well as mobile phones, tablet PCs, smartwatches, head-mounted displays or other wearables, etc. Alternatively or additionally, the devices 914 could also be other servers performing other kinds of operations that require the information that the processing servers 904 deliver.

The servers 902, servers 904 and the client computing devices 914 may communicate directly or indirectly via a computer network (or multiple networks). The network, and intervening nodes, may include various configurations and protocols including, by way of example only, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

FIG. 10 illustrates an example method 1000 in accordance with aspects of the technology. As shown in block 1002, the method includes performing, by one or more processors of a computer system, a first hash function on a key according to a first seed. This is to generate a first hash value having a fixed number of digits including a set of least significant bits and a set of most significant bits. At block 1004, the method includes performing, by the one or more processors, a second hash function on the key according to a second seed. This is to generate a second hash value having the fixed number of digits. The second seed corresponds to a parameter of a given one of the most significant bits from the first hash value. Then at block 1006 the method includes flipping, by the one or more processors, one or more of the set of least significant bits of the first hash value according to one or more least significant bits from the second hash value to generate a flipped hash. At block 1008, the method includes identifying, by the one or more processors using the flipped hash, which one of a set of computing resources to assign a data element associated with the key. And at block 1010, the method then includes assigning, by the one or more processors, the data element to the identified computing resource. By way of example, the computing resources may be web servers, database servers and/or storage devices.

As discussed above, the flip hash technology has constant-time complexity. This avoids a logarithmic deterioration in performance as the number of resources (e.g., servers) increases, because using a flip hash approach the computation cost to decide which server to send a request to does not increase logarithmically with the number of resources. Rather, the computational cost for a flip hash approach is effectively constant and regardless of the number of resources. This can have substantial technical benefits to large systems, such as load balancing across many servers, for instance by providing fast response times to queries and avoiding overloading of routing servers, which are the servers that can run the consistent hashing (flip hash) process to route requests to the servers that actually execute the requests, such as web servers.

For instance, when computing resources (e.g., servers 902, servers 904 or shards) are added, according to one aspect of the technology a minimal 1/(n+1) share of the corresponding data is redistributed from each of the previously existing resources to the newly added resource to maintain a balanced data distribution. Because mapping of keys to shards or other resources is an operation performed on every insert, the flip hash consistent range-hashing approach provides an important technical benefit for the computing system.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Moreover, unless expressly stated otherwise, the foregoing examples and arrangements are not mutually exclusive and may be implemented in various ways to achieve unique advantages. By way of example only, the merging approach for multiple sketches may be utilized with any of the other algorithms discussed herein. These and other variations and combinations of the features discussed herein can be employed without departing from the subject matter defined by the claims. In view of this, the foregoing description of exemplary embodiments should be taken by way of illustration rather than by way of limitation.

The examples described herein, as well as clauses phrased as "such as," "including" and the like, should not be interpreted as limiting the subject matter of the claims to any specific examples. Rather, such examples are intended to illustrate possible embodiments. Further, the same reference numbers in different drawings can identify the same or similar elements. The processes or other operations may be performed in a different order or concurrently, unless expressly indicated otherwise herein.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. As used in this document, "each" refers to each member of a set or each member of a subset of a set.

The invention claimed is:

1. A computer-implemented method, comprising:
performing, by one or more processors of a computer system, a first hash function on a key according to a first seed, to generate a first hash value having a fixed number of digits including a set of least significant bits and a set of most significant bits;
performing, by the one or more processors, a second hash function on the key according to a second seed, to generate a second hash value having the fixed number of digits, the second seed corresponding to a parameter of a given one of the most significant bits from the first hash value;
flipping, by the one or more processors, one or more of the set of least significant bits of the first hash value according to one or more least significant bits from the second hash value to generate a flipped hash;
identifying, by the one or more processors using the flipped hash, which one of a set of computing resources to assign a data element associated with the key; and
assigning, by the one or more processors, the data element to the identified computing resource.

2. The method of claim 1, wherein, when a quantity of the computing resources is not a power of 2, the method further comprises:
repetitively hashing the key with varying seed values one or more times until a hashing result, masked to a number of the least significant bits in the first hash value, is within the quantity of computing resources.

3. The method of claim 1, wherein the parameter is a position of the given most significant bit from the first hash value.

4. The method of claim 1, wherein the first seed is an injective function.

5. The method of claim 1, wherein the set of computing resources includes a plurality of servers, and the key corresponds to data to be cached by a specific one of the servers that is the identified computing resource.

6. The method of claim 5, wherein the plurality of servers is a plurality of distributed web servers.

7. The method of claim 5, wherein:
the plurality of servers includes a first plurality of servers and a second plurality of servers;
the first plurality of servers performing the first hash function, the second hash function, the flipping, and the identifying; and
the second plurality of servers providing data items to one or more client computing devices based on the first hash function, the second hash function, the flipping, and the identifying performed by the first plurality of servers.

8. The method of claim 7, wherein each server of the first plurality of servers separately performs the first hash function, the second hash function, the flipping, and the identifying.

9. The method of claim 1, wherein the one or more processors correspond to one or more servers, each of the one or more servers is configured to separately perform the first hash function, the second hash function, the flipping, and the identifying.

10. The method of claim 1, wherein the method provides constant-time, consistent range hashing evenly spreading a keyspace for a set of keys across the set of computing resources.

11. The method of claim 1, wherein the method provides a peak-to-average load ratio on the order of 1 while maintaining hashing monotonicity.

12. The method of claim 1, further comprising maintaining a number of least significant digits of the fixed number of digits according to a value of the first hash.

13. A computing system comprising one or more processors configured to:
perform a first hash function on a key according to a first seed, to generate a first hash value having a fixed number of digits including a set of least significant bits and a set of most significant bits;
perform a second hash function on the key according to a second seed, to generate a second hash value having the fixed number of digits, the second seed corresponding to a parameter of a given one of the most significant bits from the first hash value;
flip one or more of the set of least significant bits of the first hash value according to one or more least significant bits from the second hash value to generate a flipped hash;
identify, using the flipped hash, which one of a set of computing resources to assign a data element associated with the key; and
assign the data element to the identified computing resource.

14. The computing system of claim 13, wherein, when a quantity of the computing resources is not a power of 2, the one or more processors are further configured to:
repetitively hash the key with varying seed values one or more times until a hashing result, masked to a number of the least significant bits in the first hash value, is within the quantity of computing resources.

15. The computing system of claim 13, wherein the one or more processors are configured to provide constant-time, consistent range hashing evenly spreading a keyspace for a set of keys across the set of computing resources.

16. The computing system of claim 13, wherein the one or more processors are configured to provide a peak-to-average load ratio on the order of 1 while maintaining hashing monotonicity.

17. The computing system of claim 13, further comprising the set of computing resources.

18. The computing system of claim 17, wherein the set of computing resources includes a plurality of servers, and the key corresponds to data to be cached by a specific one of the servers that is the identified computing resource.

19. The computing system of claim 18, wherein the plurality of servers is a plurality of distributed web servers.

20. The computing system of claim 17, wherein:
the one or more processors comprise a set of load-balancing or routing servers that are configured to separately maintain the flipped hash; and
the computing resources comprise one or more of a web server, a database server or a storage device.

* * * * *